United States Patent [19]
Kettler et al.

[11] Patent Number: 5,267,429
[45] Date of Patent: Dec. 7, 1993

[54] REAR DISCHARGE MULCHING APPARATUS

[75] Inventors: Daniel J. Kettler, Beaver Dam; John B. Kuhn, Rubicon; Dean W. Benter, Horicon, all of Wis.

[73] Assignee: Deere & Company, Moline, Ill.

[21] Appl. No.: 917,542

[22] Filed: Jul. 21, 1992

[51] Int. Cl.⁵ .................. A01D 34/66; A01D /34/73
[52] U.S. Cl. ...................... 56/295; 56/320.2; 56/DIG. 20
[58] Field of Search ............ 56/295, 255, 320.1, 56/320.2, 17.5, DIG. 20

[56] References Cited

U.S. PATENT DOCUMENTS

| | | | |
|---|---|---|---|
| 2,642,711 | 6/1953 | Smith et al. | 56/266 |
| 2,691,263 | 10/1954 | Wegele | 56/25.4 |
| 2,760,327 | 8/1956 | Bovee | 56/25.4 |
| 3,543,490 | 12/1970 | Erickson | 56/25.4 |
| 3,703,071 | 11/1972 | Anderson | 56/295 |
| 4,099,366 | 7/1978 | Peterson | 56/13.6 |
| 4,106,272 | 8/1978 | Peterson et al. | 56/202 |
| 4,189,903 | 2/1980 | Jackson et al. | 56/255 |
| 4,189,904 | 2/1980 | Paker | 56/255 |
| 4,205,512 | 6/1980 | Thorud | 56/255 X |
| 4,226,074 | 10/1980 | Mullet et al. | 56/320.2 |
| 4,262,476 | 4/1981 | Benenati | 56/295 |
| 4,263,771 | 4/1981 | Jaboni et al. | 56/13.4 |
| 4,292,791 | 10/1981 | Lalonde | 56/255 |
| 4,364,221 | 12/1982 | Wixom | 56/13.6 |
| 4,543,773 | 10/1985 | Reilly | 56/320.2 X |
| 4,890,446 | 1/1990 | Israel | 56/17.5 |
| 4,916,887 | 4/1990 | Mullet et al. | 56/13.8 |
| 5,035,108 | 7/1991 | Meyer et al. | 56/320.2 X |
| 5,109,656 | 5/1992 | Zimmer | 56/17.5 |
| 5,129,217 | 7/1952 | Loehr | 56/295 X |
| 5,209,052 | 5/1993 | Carroll | 56/295 X |

FOREIGN PATENT DOCUMENTS 1277386 6/1922 United Kingdom ............... 56/295

*Primary Examiner*—Stephen J. Novosad

[57] ABSTRACT

A mechanism including a plurality of baffles positioned within a mower housing between the mower blades and a rear discharge outlet, including a first wall adjacent the edge of a respective blade and which acts to define the chamber within which the blade rotates, a second wall extending rearwardly from the first wall and defining chutes which extend between the chambers and the rear discharge outlet, and third surfaces which act to enclose the space between the first and second walls to thereby prevent air and clippings from accumulating there. The chutes generally converge at the rear outlet. Ramps are positionable within the chutes for changing the mower to a mulching mode, and include a fourth wall or surface positioned in the entrance to the chute for partially blocking air and clippings from entering the chute. A fifth surface extends rearwardly from the edge of the fourth surface to the discharge outlet. A deflector is positionable within the housing and acts to channel clippings downwardly into the blade for re-cutting at a first portion, reduce the effective volume within the chamber at a second portion, and increase the vacuuming effect at a third portion. A first blade includes a plurality of upstanding nubs which are received in respective openings formed in the second blade, and act to couple the second blade for rotation with the first blade.

26 Claims, 6 Drawing Sheets

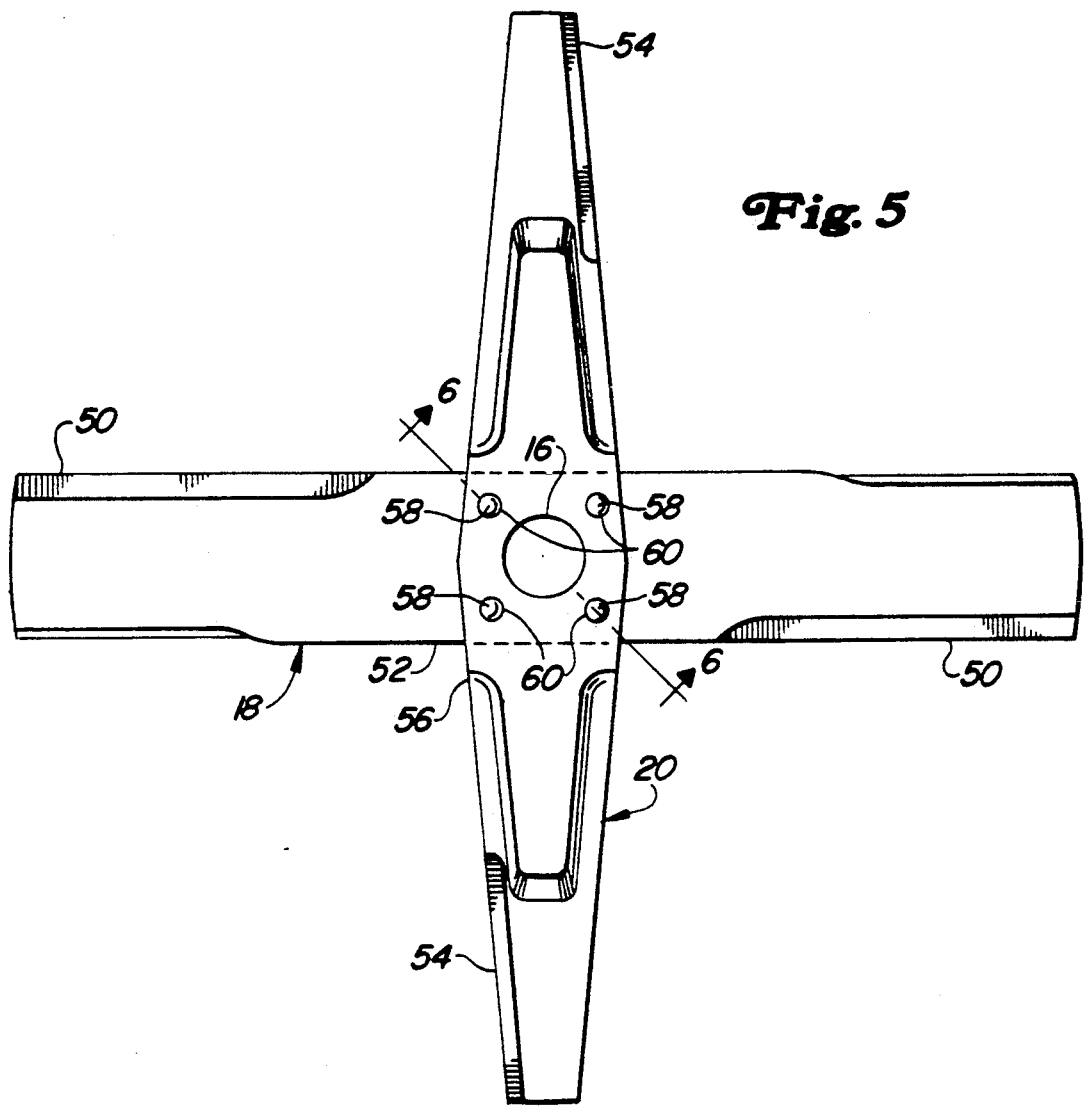
Fig. 5
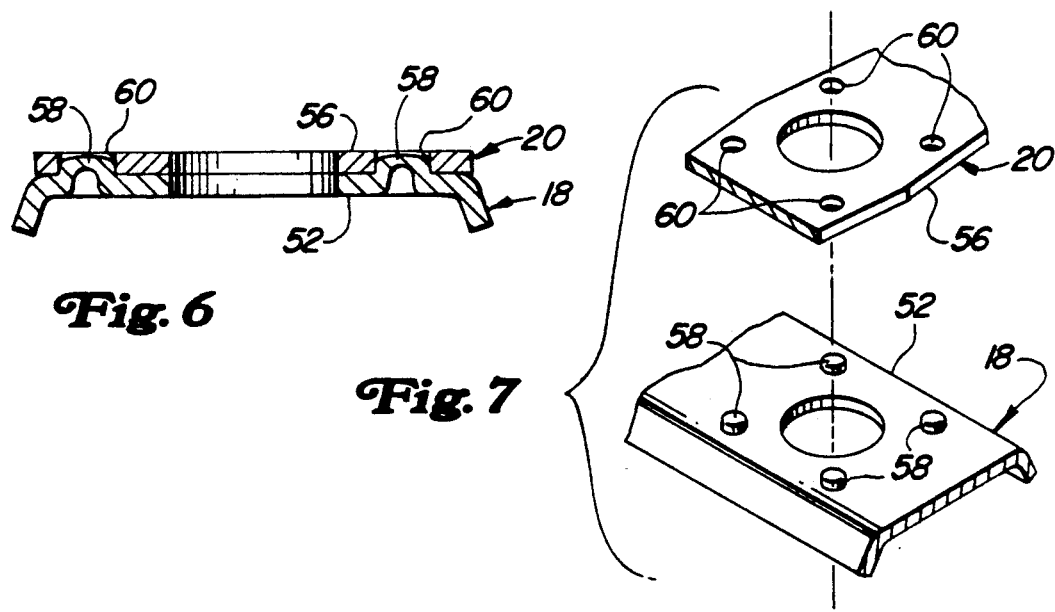
Fig. 6
Fig. 7

REAR DISCHARGE MULCHING APPARATUS

BACKGROUND OF THE INVENTION

This invention relates to rear discharge mowers and mulching mechanisms.

It is known to provide a mower deck with a plurality of blade spindles which support and drive mower blades within a mower housing The mower deck is coupled to a vehicle such as a tractor for driving the spindles and blades. It is known to position the deck beneath the belly of the tractor, and between the fore and aft pairs of tractor wheels. A discharge outlet is often formed in the rear portion of the deck for allowing the grass clippings to exit the deck and be deposited on the ground between the tractor's wheels. The various blade spindles are often coupled together by a series of belts and pulleys. The blades are often adapted to rotate in the same direction, thereby simplifying the belt and pulley arrangement, and eliminating the need for a complicated idler mechanism. Many conventional rear discharge mowers do not adequately disperse the clippings on the ground, but rather form unsightly windrows of grass clippings. It would therefore be desirable to provide an improved rear discharge mower.

It is often desirable to mulch the vegetation clippings while they remain within the mower deck, such that the size of the discharged clippings is reduced. The smaller clippings are then less noticeable in a lawn, and more readily decompose to provide nutrients to the underlying grass. Many conventional mulching mechanisms have been devised which completely block the discharge of clippings from the mower deck in an attempt to keep the clippings in an area where they can be re-cut by the blade. However, blocking the discharge outlet also acts to reduce the flow of air from the mower deck such that the vacuum effect created by the blades may be undesirably reduced, thereby reducing the quality of cut. Many mulching mowers tend to hold or suspend a large volume of clippings within the deck. When such a mower is stopped during grass mowing operations, such as for reversing the direction of travel when mowing in tight quarters, an undesirable amount of suspended clippings may fall from the deck to the ground in unsightly clumps. Furthermore, many conventional mulching mechanisms do not allow the mower to be readily switched back and forth between the mulching mode and the normal cutting mode. It would be desirable to provide an improved mulching apparatus, and particularly one suited for use with a rear discharge mower.

It is known to provide a plurality of cutting edges within a mower housing and rotatable about the same spindle such that the additional blade or blades function to re-cut or mulch the clippings within the housing. A first type of multiple blade mechanism provides various cutting blades which are formed from a single metal part, which can be a relatively costly to manufacture A second type of multiple cutting edge mechanism provides a plurality of separate cutting blades each coupled with the spindle. The primary cutting blade must be relatively sturdy and is typically made of a thick metal to thereby withstand impacts with rocks and other obstructions during mowing operations. The other blades which act to mulch or re-cut the clippings can be formed from a thinner, lighter material, since impacts with heavy obstructions are less likely. Since the blades are separate parts, the different blades can readily be formed having different thicknesses, thereby reducing the cost and the combined weight of the blades. Reducing the combined weight of the blades helps reduce wear on other mower components, such as a blade brake or clutch. The blades are either welded together or have separate mechanisms for securing the blades for rotation with the spindle. The welding or separate attachment process typically adds expense to the manufacture and assembly of the mower. It would therefore be desirable to provide a mechanism for coupling a plurality of mower blades for rotation together in an effective, cost efficient manner.

SUMMARY OF THE INVENTION

The preferred embodiment of the present invention provides a plurality of baffles positioned within a mower housing between the mower blades and a rear discharge outlet. The baffles include a first wall adjacent the edge of a respective blade and act to define the chambers within which the blades rotate. Second walls extends rearwardly from the first wall and define chutes which extend between the chambers and the rear discharge outlet. Third surfaces act to enclose the space between the first and second walls to thereby prevent air and clippings from accumulating there. The chutes generally converge at the rear outlet such that the streams of air and clippings interact at the discharge outlet. Ramps are provided which can be positioned within the chutes for changing the mower to a mulching mode. The ramps include a fourth wall or surface positioned in the entrance to the chute for partially blocking air and clippings from entering the chute. A fifth surface extends rearwardly from the edge of the fourth surface to the discharge outlet. The fifth surfaces act to discharge the clippings at a variety of different elevations or levels. A deflector is positionable within the housing and acts to channel clippings downwardly into the blade for re-cutting at a first portion, reduce the effective volume within the chamber at a second portion, and increase the vacuuming effect at a third portion. A first blade cuts the grass and a second blade mulches the clippings. The first blade includes a plurality of upstanding nubs which are received in respective openings formed in the second blade, and act to couple the second blade for rotation with the first blade.

BRIEF DESCRIPTION OF THE DRAWINGS

FIG. 5 is a top view of the first and second cutting blades.

FIG. 6 is a sectional view taken line 6 in FIG. 5.

FIG. 7 is an exploded view of the first and second blades.

DESCRIPTION OF THE PREFERRED EMBODIMENT

Figure 1:
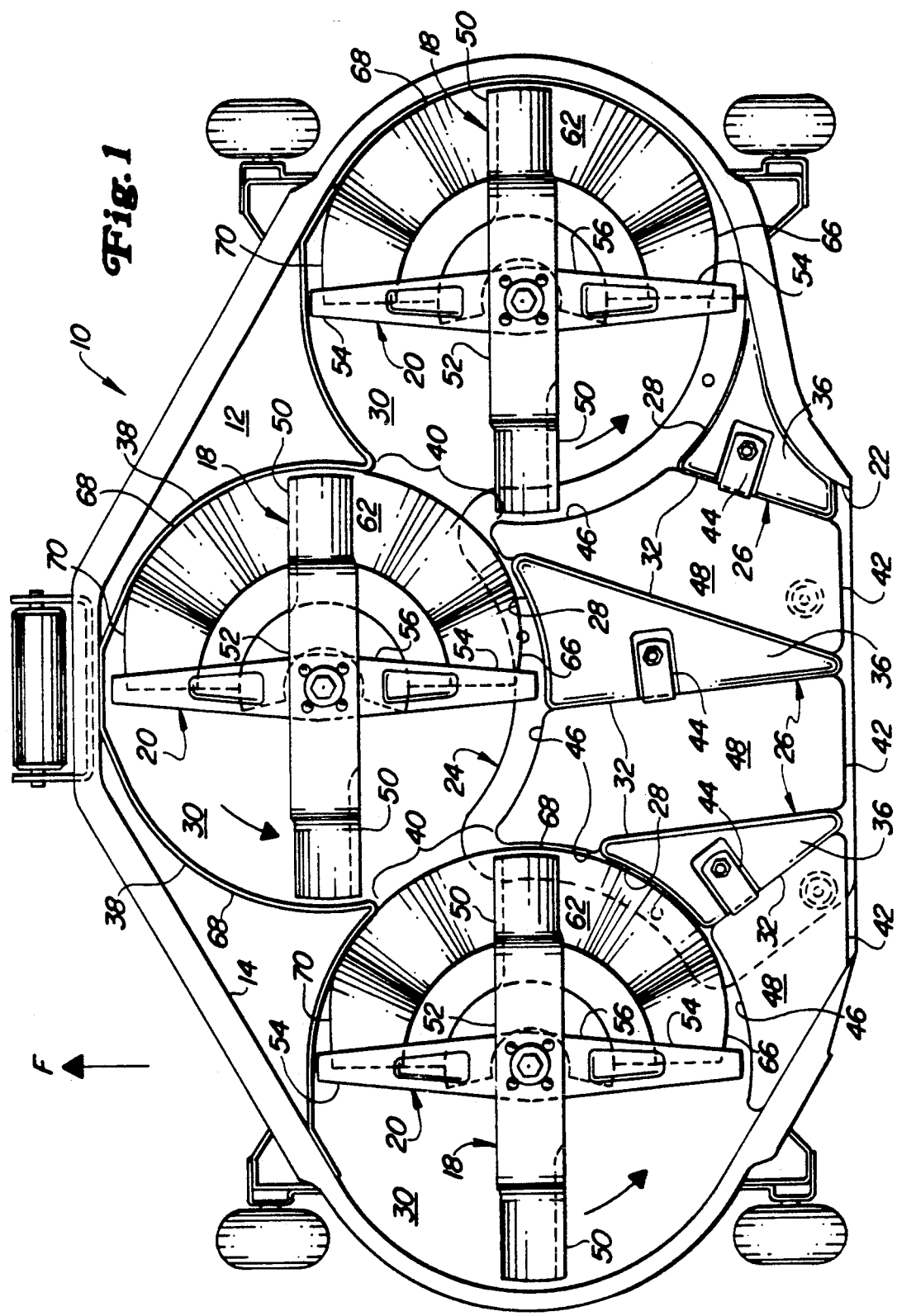
FIG. 1 is a view from beneath a multi-spindle mower deck which includes the baffle member and ramps according to the present invention.

Referring now to FIGS. 1, there is illustrated the underside of a mower deck 10 having the present invention thereattached. The mower deck or housing 10 includes a generally horizontally extending top wall 12 and vertically extending side walls 14. The deck 10 operatively supports three spindles 16, each of which drives a first and second mower blade 18 and 20. The blades 18 and 20 all rotate counter-clockwise as viewed in FIG. 1. The central rear portion of the housing 10 defines a housing opening or discharge outlet 22 which allows grass clippings to exit the housing 10. The housing 10 is adapted for being attached beneath a tractor or other suitable vehicle and between the vehicle's front and rear pairs of wheels. The arrow having reference character F shown in FIG. 1 indicates the direction of forward vehicle travel. The opening 22 therefore discharges clippings rearwardly between the wheels of the moving vehicle.

Figure 2:
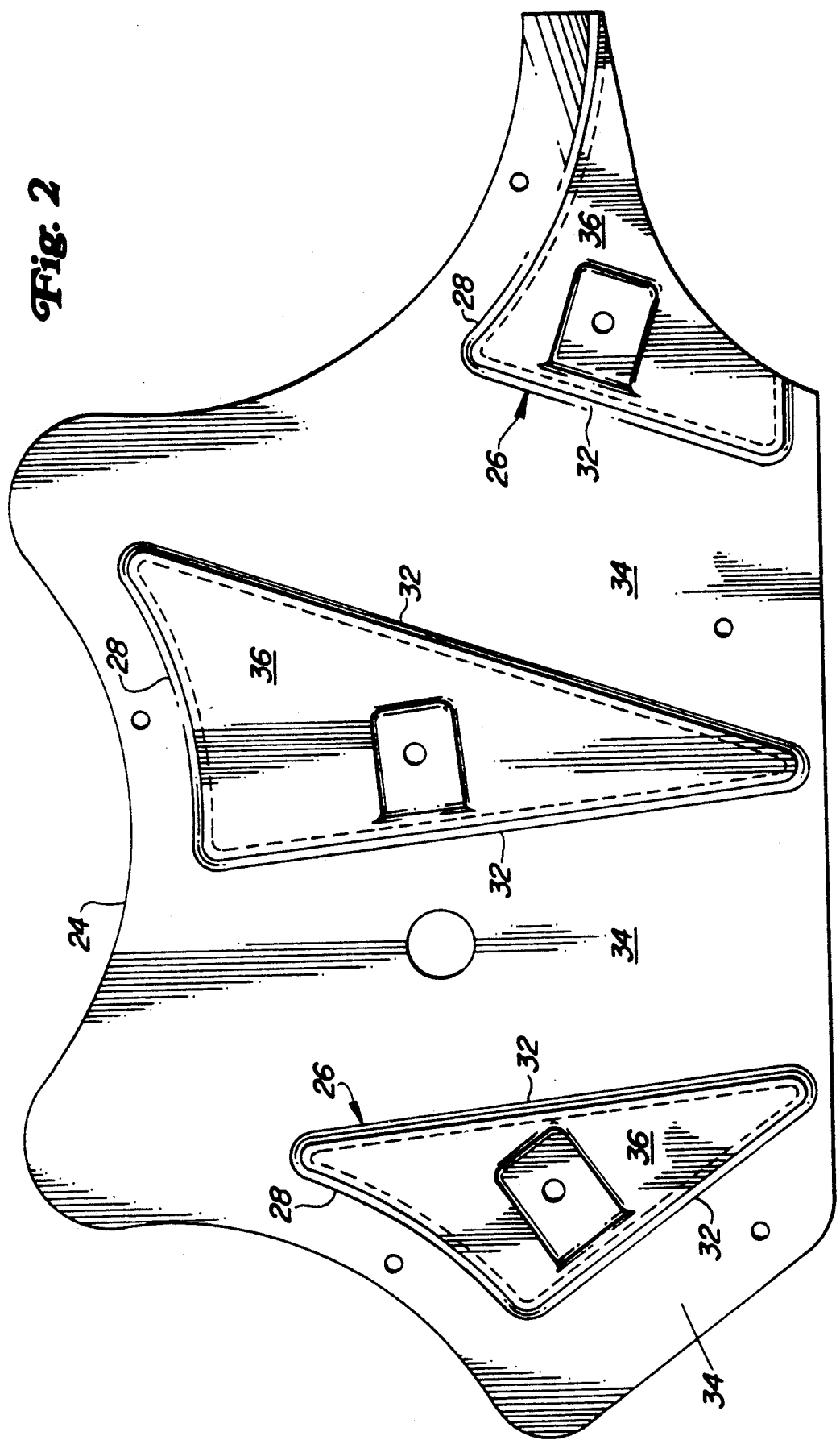
FIG. 2 is a view of the baffle member as viewed from beneath the mower deck, and with the ramps removed.
Figure 3:
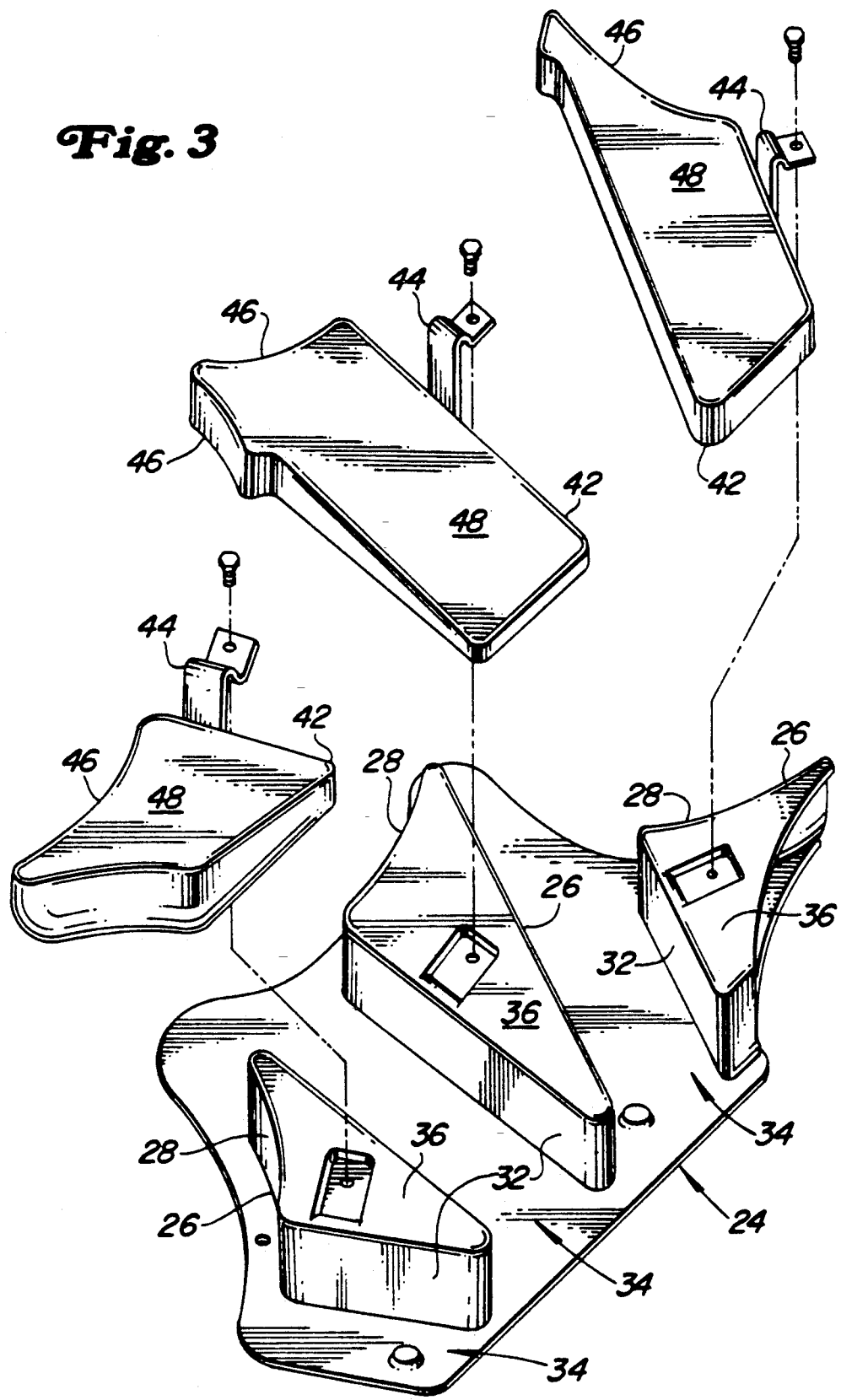
FIG. 3 is an exploded view of the baffle member and ramps.
Figure 4:
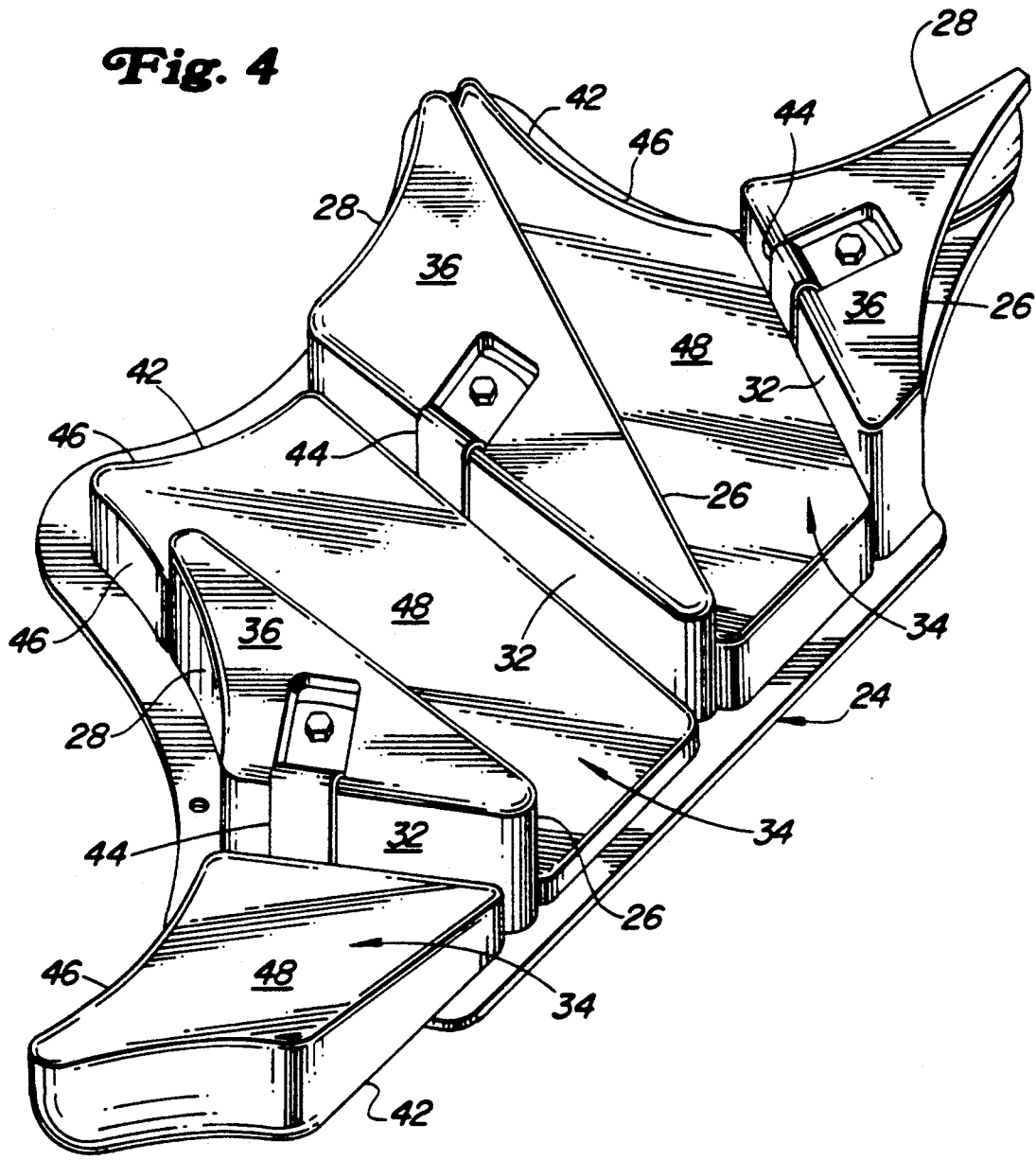
FIG. 4 is a view of the baffle member with the ramps attached for mulching operation.

A baffle member 24 is bolted or otherwise fixed beneath the top wall 12 of the mower deck 10, and between the edges of the rotating blades 18 and 20 and the rear housing opening 22. The baffle member 24, which is also shown in FIGS. 2-4, defines a plurality of individual baffles 26. The baffles 26 each include a first surface or wall 28 which extends generally vertically in close proximity to the edge of respective rotating blades 18 and 20, as seen in FIG. 1. The first surfaces 28 act to define the chambers 30 within which the blades 18 and 20 rotate. Second surfaces or walls 32 which are defined by each baffle 26 extend generally vertically, and extend rearwardly from the first surfaces 28 to positions proximate the rear housing opening 22. The second surfaces 32 act to define chutes 34 which extend rearwardly from respective cutting chambers 30 to the rear housing opening 22. The chutes 34 channel grass clippings from the cutting chambers 30 to be discharged through the housing openings 22 Third surfaces or walls 36 are defined by the baffle member 24 and extend generally horizontally between the lower portions or edges of the first and second surfaces 28 and 32. The third surfaces 36 act to enclose the space between the first and second surfaces 28 and 32 and the top wall 12 of the housing 10 for preventing air and clippings from accumulating in that area. The baffle member 24 is a single plastic part with the individual baffles 26 formed therein. The baffle member 24 is bolted or otherwise fixed beneath the top wall 12 of the housing 10.

Vertically extending front plates 38 are attached beneath the top wall 12 of the housing 10 near the front of the housing 10 and act to define at least a portion of the front wall of the cutting chambers 30. Gaps 40 are formed between the front plates 38 and the first surfaces 28 to allow limited passage of air between the chambers 30.

During normal mowing operation the ramps 42 shown in FIG. 3 are not attached to the baffle member 24. The blades 18 and 20 rotate within the cutting chambers 30 to create counterclockwise currents of air as seen in FIG. 1. The clippings are carried by the air currents, and also travel counterclockwise within the chambers 30. The clippings are allowed to pass between chambers 30 via the gaps 40. The clippings continue traveling within the chamber 30 until they reach the area where the chute 34 meets the chamber 30. The grass clippings can then enter the chute 34 to be driven rearwardly by the air current created by the blades 18 and 20. The three chutes 34 are each directed toward the centerline of the deck 10 and vehicle in a converging fashion. The streams of clippings exiting the chutes 34 will therefore merge and interfere with one another. The convergence of streams acts to disperse the clippings relatively evenly between the wheels of the tractor, and generally without being clumped in unsightly windrows. The first walls 28 of the baffles 26 act to precisely define the cutting chambers 30. The third surfaces 36 act to enclose the areas between the first and second surfaces 28 and 32, thereby defining generally enclosed box-like structures The third surfaces 36 prevent air and clippings from accumulating within the space between the first and second surfaces 28 and 32, and therefore less grass clippings will fall out in clumps from beneath the deck 10 when the vehicle stops during mowing operation.

The chutes 34 extend to positions directly adjacent the chambers 30, and areas where pockets of air or clumps of clippings could accumulate have thereby been eliminated. Furthermore, since the chute entrances extend directly adjacent the chambers 30, the airborne clippings enter the chutes 34 from the chambers 30 with relatively high velocities. The air and clippings travel rearwardly and inwardly toward the centerline of the deck 10. The chutes 34 are directed inwardly toward each other to facilitate converging streams of air and clippings. The interaction of the streams of clippings acts to disperse and spread the clippings evenly within the lateral space between the tires of the vehicle The present invention is also adapted for mulching operations. As best seen in FIGS. 3 and 4, ramps 42 can be positioned within the chutes 34 for adapting the mower to mulching operations The ramps 42 include brackets 44 which extend laterally and into abutment with the third surfaces 36 of the baffles 26. The brackets 44 can be bolted or otherwise fixed to the third surfaces 36 to thereby secure the ramps 42 within the chutes 34. The location of the attaching mechanism allows an operator to easily install or remove the ramps 42 without requiring the deck 10 to be removed from the vehicle. A horizontally extending fourth surface or wall 46 is defined by each ramp 42, and is positioned adjacent the edge of the rotating blade during operation. The fourth surface 46 acts to partially block the chute entrance so that clippings within the cutting chambers 30 are hindered or partially blocked from entering the chute 34 The fourth surfaces 46 help maintain the clippings within the chambers 30 for a longer period of time for being re-cut or mulched by the rotating blades 18 and 20. However, the fourth surfaces 46 only partially block the entrance of the chute 34, and therefore allow a sufficient amount of air and mulched clippings to flow through the chute 34 to insure a proper vacuum or lifting effect within the chamber 30. Cut quality therefore remains relatively high. Generally horizontal fifth surfaces 48 extend rearwardly from the edge of the fourth surfaces 46. The fifth surfaces 48 act to enclose the area within the chute 34 directly downstream of the fourth surfaces 46, and thereby prevent air and clippings from accumulating therein Velocities within the chute 34 therefore remain relatively high for transporting mulched clippings rearwardly. The respective fifth surfaces 48 achieve a variety of different levels or elevations at the exit of the chutes 34. The streams of mulched clippings are thereby discharged rearwardly from the chutes 34 at a variety of different levels or elevations, which tests have shown can enhance the even distribution of clippings when operating in a mulching mode.

The blades 18 and 20 as shown in FIG. 1 rotate counterclockwise. The grass is cut by the first blade 18 within the front portion of the chamber 30 shown at the top of FIG. 1. The clippings then travel counterclockwise, and quickly pass next to the gaps 40 formed between the chambers 30. Therefore, the clippings may tend to travel to the left through the gaps 40 between chambers 30 as seen in FIG. 1. These clippings may tend to accumulate within the chamber 30 on the left in FIG. 1, and the discharge of clippings from this chamber 30 might overpower the streams of clippings exiting the other chutes 34 such that the majority of the clippings are deposited to the right of the housing 10 as seen in FIG. 1 and beneath one side of the vehicle. The ramp 42 within the left-hand chute 34 shown in FIG. 1 provides a fourth surface 46 which covers or blocks a greater area of the respective chute 34 than does the fourth surfaces 46 of the other ramps 42. Because the restriction created at the entrance to the left-hand chute 34 is greater than the other chutes 34, a higher pressure will exist within the left-hand chamber 30. Clippings may therefore be forced through the gap 40 into the center chamber 30. Similarly, clippings may be hindered from passing into the left-hand chamber 30 through the gap 42 due to the higher pressure which exists therein. Clippings will thereby be prevented from accumulating in the left-hand chamber 30, and the stream of clippings exiting the left-hand chute 34 is reduced such that the other streams are not overpowered. The distribution of clippings to the rear of the housing 10 is thereby enhanced.

Referring now to FIGS. 5-7, there is shown the cutting blades 18 and 20 according to the present invention. First and second blades 18 and 20 are each formed separately, and are then assembled for operation. The first blade 18 acts to cut growing vegetation. The outer cutting portions 50 of the first blade 18 are offset beneath the central portion 52 of the first blade 18. The second blade 20 acts as a mulching blade and includes an outer cutting portion 54 that is offset above the central portion 56 of the second blade 20. The cutting portions 50 and 54 of the first and second blades 18 and 20 are therefore vertically offset approximately one-half (½) inch. The central portion 52 of the first blade 18 has upstanding nubs 58 formed therein which are received by mating openings 60 defined by the central portion 56 of the second blade 20. When the blades 18 and 20 are pressed together on the spindle 16, the nubs 58 and openings 60 interact to prevent relative rotation between the first and second blades 18 and 20. The nubs 58 and openings 60 thereby fix or secure the two blades 18 and 20 for rotation together, and eliminate the need for weldments or other relatively costly coupling mechanisms.

Figure 8:
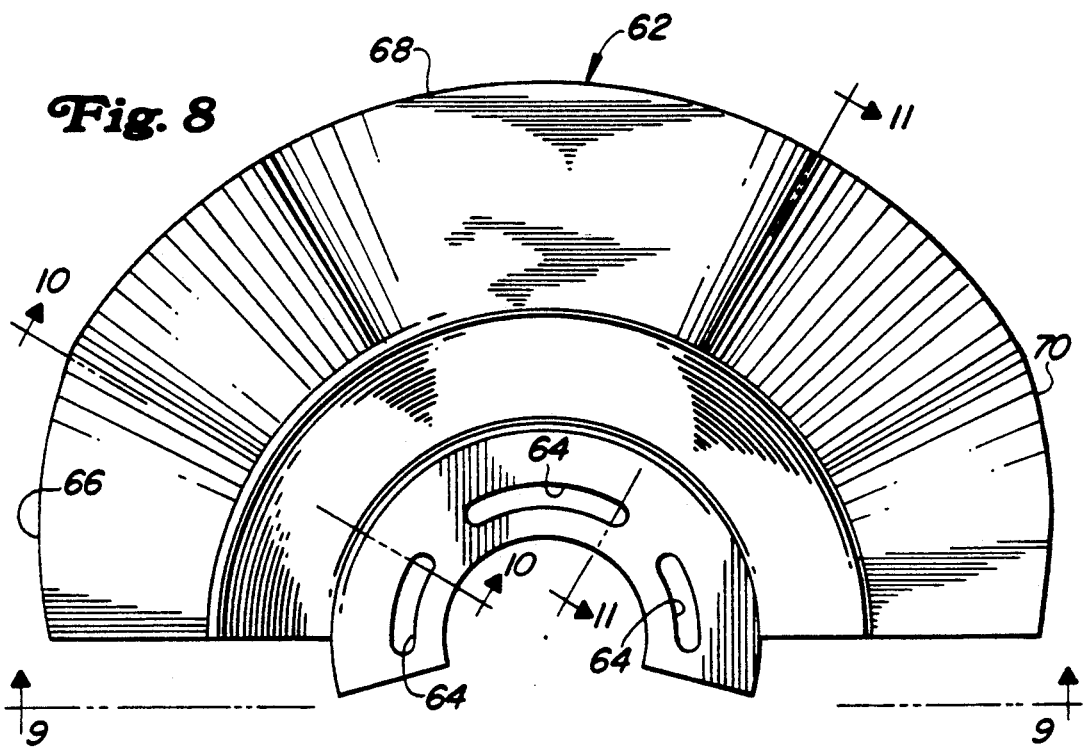
FIG. 8 is a top or plan view of the deflector.
Figure 9:
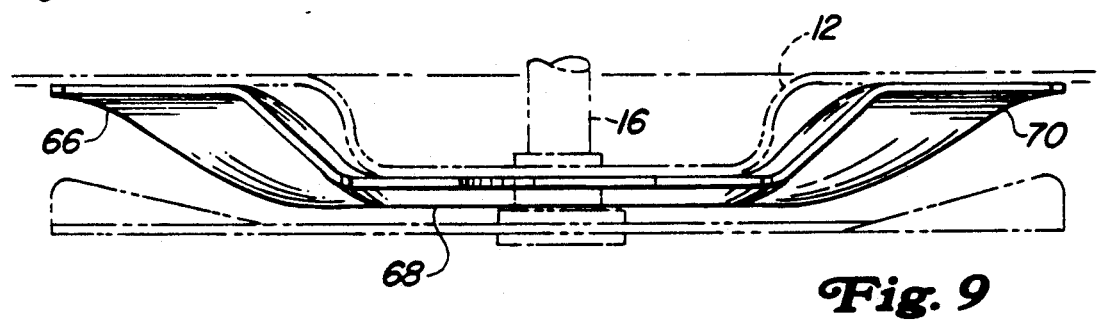
FIG. 9 is a side view of the deflector taken along line 9—9 in FIG. 8
Figure 10:
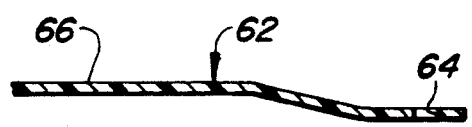
FIG. 10 is a sectional view of the deflector taken along line 10—10 in FIG. 8.
Figure 11:
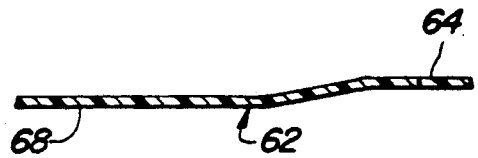
FIG. 11 is a sectional view of the deflector taken along line 11—11 in FIG. 8.

Referring now to FIGS. 8 and 9, there is shown a deflector means 62 which is positionable within the cutting chambers 30 as seen in FIG. 1. The deflector 62 extends in an arc approximately 180°. Slots 64 formed in the deflector 62 receive bolts for securing the deflector 62 in place within the chamber 30. The bolts which couple the spindle housing to the mower deck 10 can be used to also secure the deflector 62 in place. The deflector 62 includes a first portion 66 which is adjacent the top wall 12 of the housing 10, and which extends downwardly in the direction of blade travel. A second portion 68 is generally flat or horizontal, and extends further in the direction of blade travel. A third portion 70 slopes upwardly in the direction of blade travel to a position substantially adjacent the upper wall 12 of the housing 10. The first, second and third portions 66, 68 and 70 each extend approximately 60°. The deflector 62 serves to reduce the volume of the respective chamber 30 and thereby reduces the quantity of clippings suspended within the chamber 30 at any one time. The smaller quantity of suspended clippings reduces the amount of clippings which may fall out of the housing 10 during a vehicle stop. The first portion 66 of the deflector 62 acts as a ramp for directing air and clippings back downwardly into the blade 18 or 20 to be re-cut or mulched. The second portion of the deflector 62 acts to reduce the volume within the chamber 30 at that location. The effective volume within the chamber 30 at the location of the third portion 70 of the deflector 62 is greater than at the location of the second portion 68, which causes the high pressure air that has passed beneath the deflector's second portion 68 to expand and rush upwardly due to the lower pressure and greater volume beneath the third portion 70 of the deflector 62. The low pressure area and upward rushing of air acts to increase the vacuum effect in the area of the deflector's third portion 70. The deflector 62 can be positioned at a location within the chamber 30 that would situate the third portion 70 directly above a critical area, such as an area which otherwise has poor vacuum action. The third portion 70 of the deflector 62 could also be positioned over an area which is directly behind a tire which runs over and compresses the grass before it can be cut. The increased vacuum action created near the deflector's third portion may help lift the trampled grass so that it may be cut properly. The first and third portions 66 and 70 taper radially inwardly so as to accomodate the radius formed where the top wall 12 of the mower deck 10 meets the vertically extending side wall 14.

I claim:
1. A rear discharge mower mechanism, comprising:
  a mower blade housing within which a plurality of mower blades rotate to cut vegetation, a rear portion of the housing defining a housing opening through which cut materials exit the housing,
  a plurality of baffles each positioned generally between a respective mower blade and the housing opening, each of said baffles including a vertically extending first surface positioned adjacent the rotational path of a respective mower blade, said baffles each including at least one vertically extending second surface connected with and extending rearwardly from the first surface, said second surfaces defining chutes between the baffles for channeling vegetation clippings rearwardly from the rotational paths of respective mower blades to the housing opening, each of said baffles also including a generally horizontal third surface extending between a lower portion of the first and second surfaces for generally enclosing the space between the first and second surfaces to thereby prevent clippings and air from accumulating therein.
2. The invention of claim 1, wherein the chutes extend rearwardly and inwardly toward the centerline of the housing such that the paths of travel of the clippings from the respective chutes converge near the centerline of the housing.

3. The invention of claim 2, wherein the baffle means are a single integral part.

4. The invention of claim 3, wherein the single integral part is a plastic material fixed within the housing.

5. The invention of claim 1, wherein each chute extends to the housing opening independent of and without merging with any other chute.

6. A rear discharge mower mechanism, comprising:
a mower blade housing within which a plurality of mower blades rotate to cut vegetation, a rear portion of the housing defining a housing opening through which cut materials exit the housing,
a plurality of baffle means each positioned generally between a respective mower blade and the housing opening,
a vertically extending first surface defined by said baffle means and positioned adjacent the rotational path of a respective mower blade,
at least one vertically extending second surface defined by said baffle means and connected with and extending rearwardly from the first surface,
chutes being defined by the second surfaces and between the baffle means for channeling vegetation clippings rearwardly from the rotational paths of respective mower blades to the housing opening, said chutes extending rearwardly and inwardly toward the centerline of the housing such that the paths of travel of the clippings from the respective chutes converge near the centerline of the housing, said chutes each extending independent of and without merging with any other chute,
each of said baffle means also including a generally horizontal third surface extending between a lower portion of the first and second surfaces for generally enclosing the space between the first and second surfaces to thereby prevent clippings and air from accumulating therein.

7. The invention of claim 6, wherein the baffle means are a single integral part formed of a plastic material.

8. The invention of claim 1, and further including a vertically extending fourth surface positioned within the chute generally adjacent the rotational path of the mower blade for partially blocking the entrance of air and clippings into the chute.

9. The invention of claim 8, wherein the fourth surface extends downwardly from a top wall of the housing a distance less than the first surfaces extend downwardly from the top wall of the housing.

10. The invention of claim 8, wherein a horizontally extending fifth surface extends rearwardly from a lower portion of the fourth surface to a position adjacent the housing opening for guiding clippings toward the housing opening and for preventing air and clippings from accumulating within the chute near the top wall of the housing.

11. The invention of claim 10, wherein the portions of the fifth surfaces adjacent the housing opening are at a plurality of vertically offset positions to discharge air and clippings at a variety of elevations.

12. The invention of claim 11, wherein the fifth surface is defined by a ramp member insertable into the chute and removable for changing from a normal mowing mode and a mulching mode.

13. The invention of claim 12, wherein the ramp members include a bracket which extends outwardly beneath the horizontally extending third surface of respective baffles, and a coupling means for selectively and rigidly coupling the bracket to the third surface.

14. A rear discharge mower mechanism, comprising:
a mower blade housing within which a plurality of mower blades rotate to cut vegetation, a rear portion of the housing defining a housing opening through which cut materials exit the housing,
a plurality of baffle means each positioned generally between a respective mower blade and the housing opening,
a vertically extending first surface defined by said baffle means and positioned adjacent the rotational path of a respective mower blade,
at least one vertically extending second surface defined by said baffle means and connected with and extending rearwardly from the first surface,
chutes being defined by the second surfaces and between the baffle means for channeling vegetation clippings rearwardly from the rotational paths of respective mower blades to the housing opening, said chutes extending rearwardly and inwardly toward the centerline of the housing such that the paths of travel of the clippings from the respective chutes converge near the centerline of the housing,
a generally horizontal third surface being defined by said baffle means and extending between a lower portion of the first and second surfaces for generally enclosing the space between the first and second surfaces to thereby prevent clippings and air from accumulating therein,
ramp means positioned within respective chutes, said ramp means including a vertically extending fourth surface positioned within the chute and generally adjacent the rotational path of the mower blade for partially blocking the entrance of air and clippings into the chute, said ramp means also including a horizontally extending fifth surface extending rearwardly from a lower portion of the fourth surface to a position adjacent the housing opening for guiding clippings toward the housing opening and for preventing air and clippings from accumulating within the chute near the top wall of the housing, the portions of the fifth surfaces adjacent the housing opening being at a plurality of vertically offset positions to discharge air and clippings at a variety of elevations.

15. A mowing mechanism adapted for use with a rotary mower which includes a mower blade rotatable within a housing for cutting vegetation, said housing having a top wall and side walls extending downwardly from the top wall, said mechanism comprising:
a deflector coupled between the top wall of the housing and the mower blade and extending generally in an arc about the blade's axis of rotation, said deflector having a first generally arcuate portion which extends downwardly in the direction of blade rotation and from the top wall of the housing to a position above and near the path of the rotating mower blade, a second portion extending generally horizontally and spaced a relatively small distance above the mower blade, and a third portion extending upwardly from the second portion in the direction of blade rotation and to a position adjacent the top wall of the housing 16. The invention of claim 15, wherein the arc of the deflector extends approximately 180°.

17. The invention of claim 15, wherein the first arcuate portion extends approximately 60°.

18. The invention of claim 15, wherein the second arcuate portion extends approximately 60°.

19. The invention of claim 15, wherein the third arcuate portion extends approximately 60°.

20. The invention of claim 15, wherein the deflector extends approximately 180°, and the first, second and third arcuate portions each extend approximately 60°.

21. A mower blade mechanism, comprising:
a mower housing,
a first mower blade rotatable within the housing for cutting vegetation,
a second blade abuttable with the first mower blade, one of said first or second blades including at least one nub means upstanding from a surface of said first or second blade, the other of the first or second blades including an opening for receiving the nub means for coupling the first and second blades for rotation together.

22. The invention of claim 21, wherein a plurality of said nub means and respective openings are provided.

23. The invention of claim 21, wherein the first mower blade is positioned in abutment beneath the second blade, said nub means being formed integral with the first mower blade, and said opening being formed in the second blade.

24. The invention of claim 23, wherein the first and second blades each include a cutting portion, the cutting portion of the first blade acting to cut growing vegetation, and the cutting portion of the second blade acting as a mulching blade for re-cutting the materials already cut by the first blade, said cutting portion of the second blade being offset to an elevation higher than the cutting portion of the first blade.

25. A mower blade mechanism, comprising:
a first mower blade rotatable for cutting vegetation, said first mower blade including a plurality of nub means upstanding from an upper surface of the first mower blade,
a second blade in abutment with said upper surface of the first mower blade, said second blade defining a plurality of openings for receiving respective nub means for coupling the first and second blades for rotation together.

26. The invention of claim 25, wherein the first and second blades each include a cutting portion, the cutting portion of the first blade acting to cut growing vegetation, and the cutting portion of the second blade acting as a mulching blade for re-cutting the materials already cut by the first blade, said cutting portion of the second blade being positioned at an elevation higher than the cutting portion of the first blade.

* * * * *